Feb. 13, 1951 F. C. WILSON 2,541,395
PRESSURE RELIEF VALVE
Filed April 25, 1947 2 Sheets-Sheet 1
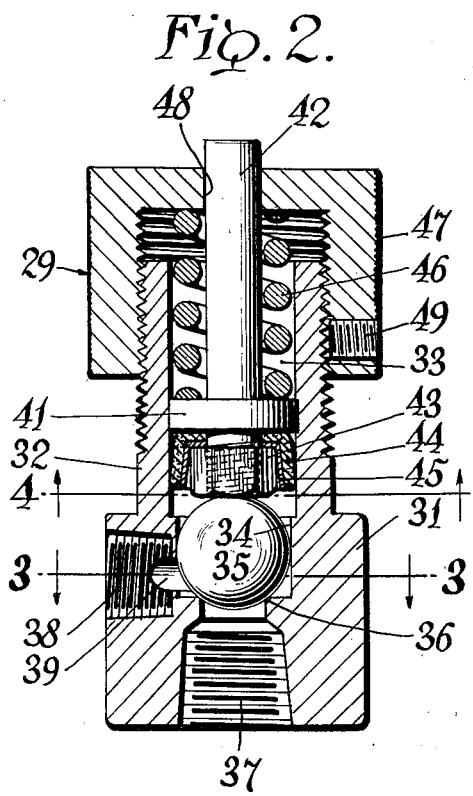
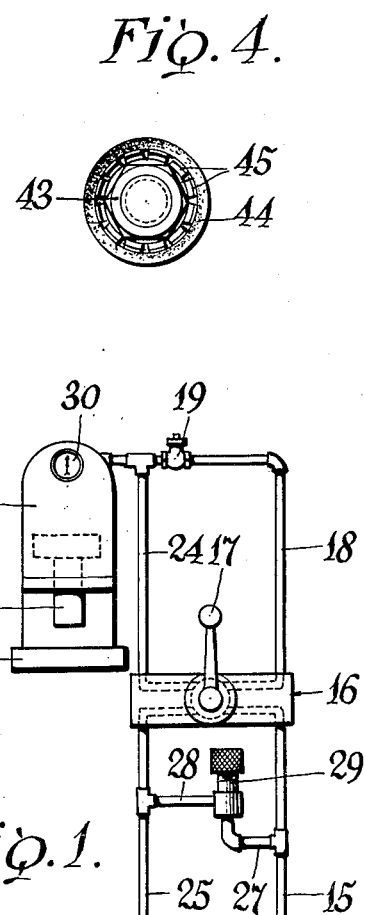
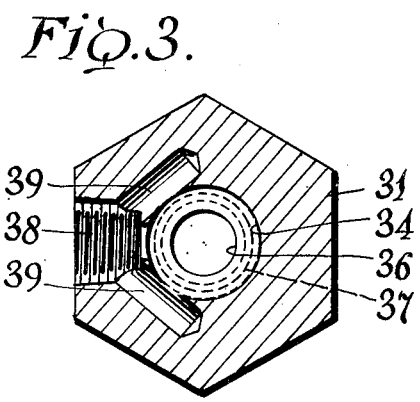
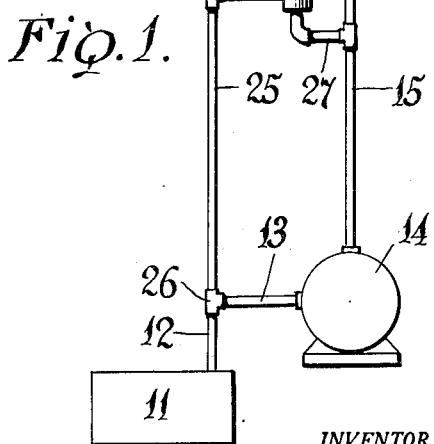
INVENTOR.
Frank C. Wilson,
BY
ATTORNEY Feb. 13, 1951　　　F. C. WILSON　　　2,541,395
PRESSURE RELIEF VALVE
Filed April 25, 1947　　　　　　　　2 Sheets-Sheet 2

INVENTOR.
Frank C. Wilson,
BY
John Lowrie
ATTORNEY

Patented Feb. 13, 1951

2,541,395

UNITED STATES PATENT OFFICE 2,541,395

PRESSURE RELIEF VALVE

Frank C. Wilson, Arcade, N. Y.

Application April 25, 1947, Serial No. 743,837

15 Claims. (Cl. 137—53)

This invention relates to an improvement in pressure relief valves for the regulation of the maximum hydraulic pressure which may be applied in hydraulic pressure systems, e. g., the hydraulic pressure applied to the piston of the ram of a hydraulic press.

When hydraulic fluid is pumped to the cylinder of a ram element, e. g., the working cylinder of a hydraulic press, a necessary factor of safety requires a pressure relief valve in the hydraulic fluid transmission line in order to safeguard the pump from injury. Such valves may also include a regulating feature for predetermining a limit of the hydraulic pressure employed for the operation of the ram element. The valves heretofore proposed for these purposes, and which include poppet valve elements in the ordinary relationship, have been unsatisfactory in two principal respects, viz., they are not adapted for adjustment over a wide range of pressures and they have a characteristic of opening and closing in such a manner as to chatter and cause water hammer effects, thereby developing excessive and disturbing noise and tending to cause injury to their parts as well as to the parts of the associated equipment.

The invention proposes a pressure relief valve which overcomes the foregoing objections and which includes novel features of construction and arrangement such that it may be adjusted for the regulation of operating pressures within a wide range, and yet which will be sensitively responsive to small average pressure differentials; and which, moreover, performs its functions without chattering and water hammering effects.

The invention includes novel features which are applicable for use in the respective types of hydraulic pressure systems wherein the pressure at the outlet side of the pump is substantially constant, that is to say, the pump is of the constant pressure or uniform discharge type, and wherein the pressure at the outlet side of the pump is pulsating, that is to say, rises and falls in each cycle of pump operation.

Generally speaking, these features, by which the novel and advantageous results above stated are obtained, involve, in cooperative relation as a combination, a spring loaded ball check valve element, a member which transmits the spring loading to the ball and by which the ball is held seated, this member being constructed to act with braking effect and so operating in conjunction with the hydraulic forces encountered as to preclude a violent hammering of the ball against its seat at times of closing, and a cage chamber for the ball, so formed in relation to it, as to prevent the ball from hammering or chattering in the course of its seating operation while permitting it to have a certain beneficial degree of turning movement about a diametrical axis, and so related to the member as to provide a beneficial dash pot effect in connection with the operation of the member to effect the seating of the ball.

The invention is disclosed in two embodiments, one of which is applicable to hydraulic pressure systems wherein the pump is of the constant pressure type and the other of which, equally applicable to hydraulic pressure systems of the constant flow type, is also applicable to hydraulic pressure systems wherein the pump is of the pulsating pressure type. The second embodiment includes additional features, in accordance with the invention, which are peculiar to hydraulic pressure systems wherein the pump is of the pulsating pressure type and are not required in systems wherein the pump is of the constant pressure type.

In the accompanying drawings:

Figure 1 is a diagram showing the arrangement of a relief valve in accordance with the invention in a hydraulic pressure system wherein the hydraulic pressure is applied to the piston of the ram of a hydraulic press.

Figure 2 is a longitudinal sectional view of the embodiment of relief valve for use in systems wherein the pump is of the constant pressure or uniform discharge type.

Figure 3 is a sectional view on the line 3—3 of Figure 2, looking in the direction of the arrows, and showing the discharge porting.

Figure 4 is a sectional view on the line 4—4 of Figure 2, looking in the direction of the arrows, and showing the piston and brake element connections.

Figure 5:
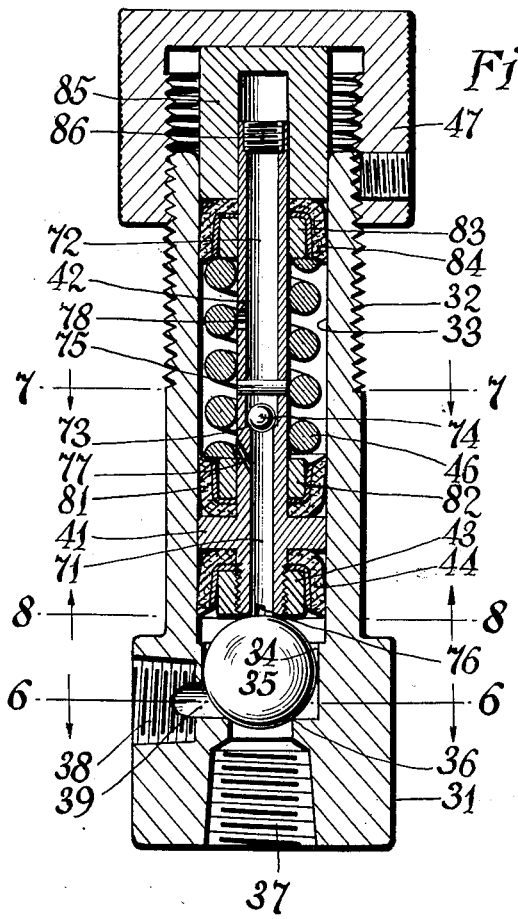
Figure 5 is a longitudinal sectional view of the embodiment of relief valve for use in systems wherein the pump is of the pulsating pressure type.
Figure 7:
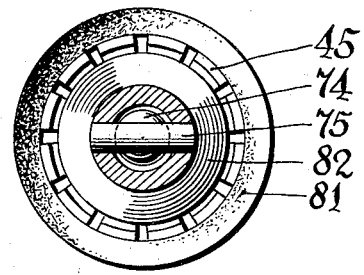
Figure 8:
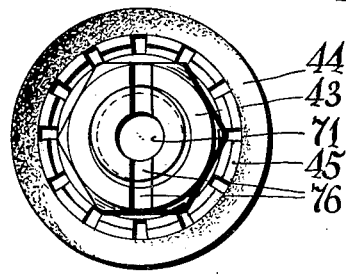
Figure 6:
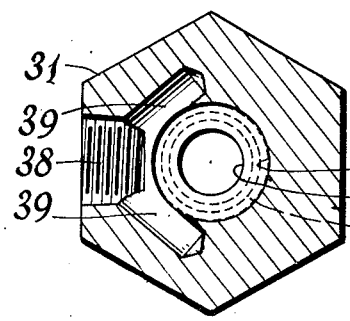
Figure 6 is a sectional view on the line 6—6 of Figure 5, looking in the direction of the arrows.

Figures 7 and 8 are sectional views on an enlarged scale on the respective lines 7—7 and 8—8 of Figure 5, looking in the direction of the arrows.

Figure 9:
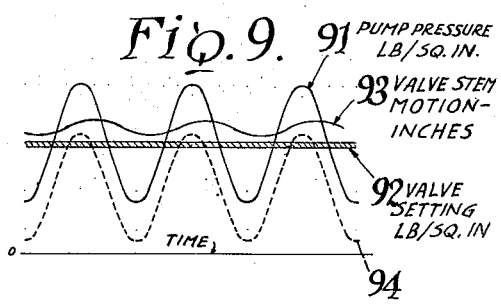

Figure 9 is a diagram of the action of the valve shown in Figure 5.

Figure 1 illustrates schematically a hydraulic press circuit to which the valve of the present invention is applicable. A liquid reservoir 11 is provided with a suction pipe 12 connected to a branch 13 leading to the inlet side of a pump 14. Liquid discharged by the pump flows through the line 15 into a four-way valve 16, whose operating lever 17 may be so positioned as to connect the line 15 with a press supply line 18 which leads, through a check valve 19, into the working cylinder of a hydraulic press 21. The liquid delivered under pressure to the press cylinder forces the ram 22 toward a fixed work supporting bed 23 and into operative relation to the work. When the hydraulic pressure is relieved, a spring or other means (not shown) causes the ram 22 to be withdrawn and returned to its normal idle position.

A return circuit for the press is provided by a line 24 connected to the line 18 at a point between the press cylinder and the valve 19 and leading to the valve 16, whose handle 17 may be shifted to an alternate position to connect the line 24 to a drain 25, connected to both the suction pipe 12 and branch 13 through a T 26. When the valve 16 is so positioned, fluid communication between the lines 15 and 18 is closed, and the liquid will drain from the press 21 into the tank 11 or pump inlet, reverse flow into the line 18 being prevented by the check valve 19. When the control handle 17 is shifted to a third or neutral position, the lines 24 and 25, as well as the lines 15 and 18, are disconnected from each other.

A by-pass or relief circuit is provided between the lines 15 and 25 by branch pipes 27 and 28 respectively connected to inlet and outlet ports of a pressure relief valve 29. This circuit comes into play when communication between the lines 15 and 18 is closed by the positioning of the valve 16, or when the movement of the ram 22 is arrested by striking the work on the press bed 23. Under either of these conditions, the increased pressure of the pump effluent forces open the valve element of the relief valve 29, and the liquid circulates from the pump outlet back into the pump inlet, via the lines 25 and 13. The valve 29 is adjustable to open at a predetermined desired pressure, which may be ascertained by setting the valve against the reading of a pressure gage 30, conveniently mounted on the press 21. Hydraulic presses of the type herein contemplated may be called upon to perform various operations, some requiring pressures of only a few hundred pounds, and others pressures of as much as say six thousand or more pounds per square inch. The present invention provides a pressure relief valve suited to such widely varying service conditions.

The pump 14 may be either a constant or variable discharge type. The constant pressure pump, so called, is of well known usage in hydraulic press systems and characteristically discharges its effluent at pressures within a range so narrow and with fluctuations so small for all practical purposes that the instantaneous pressure and rate of volumetric discharge may be regarded as practically constant. The variable discharge or pulsating pump, also of well known usage in hydraulic press systems, discharges its effluent with pressures and at volumetric rates which substantially fluctuate from instant to instant although the pump operating speed itself is constant. The present invention provides a pressure relief valve useful for both conditions.

The embodiment of relief valve 29 shown in Figures 2, 3 and 4 may be effectively used when the variations in pump outlet pressure are small, i. e., when the pump is of the so called constant pressure type. This embodiment includes a casing or body which provides a seat section 31 and a co-axial barrel 32 delimiting a cylindrical chamber 33. The seat section 31 is formed to provide a cylindrical cage 34 for a ball valve element 35, adapted to close upon a valve seat 36 which is in direct communication with a tapped inlet port 37. The seat section is also provided with a laterally extending discharge port 38, which communicates with the cage recess 34 through angularly related tangential ducts 39, as shown in Figure 2.

The chamber 33 contains a reciprocatory piston 41 which for manufacturing convenience is loosely mounted upon the lower portion of an axially extending stem 42. The piston 41 is held against downward displacement from the stem 42 by a nut 43. The stem 42, below the piston 41, is encircled by a cup washer 44 of leather or other appropriate material, which is pressed outwardly by the hydraulic fluid into firm engagement with the wall of the chamber 33. This action may also be accomplished or supplemented, mechanically, by means of a multi-fingered spring washer 45 (Figure 4) conforming in general outline to, and arranged within, the cup washer. The washers 44 and 45 are secured by the nut 43 upon the stem 42 in adjacency to the piston 41. While the clearance between the wall of the chamber 33 and the piston 41 is sufficient to permit the piston to reciprocate readily in the cylinder, the frictional drag of the cup washer greatly overcomes such freedom of movement and, in effect, creates a constantly acting brake which retards the motion of the piston in either direction.

The piston 41 is normally urged towards the ball valve element 35, thereby, through the washers 44 and 45 and the nut 43, to cause the lower end of the stem 42 directly or by means of the nut 43 to engage the ball and hold it upon its seat 36. The pressure upon the piston 41 is applied by a helical expansion spring 46 which surrounds the stem 42. The spring 46 is retained in compressed condition by a cap 47, internally threaded for engagement with external threads upon the barrel 32, the cap thereby being positionably adjustable in the axial direction and being engaged by the upper end of the spring 46. The cap 47 is formed with an axial aperture 48 through which the upper portion of the stem 42 projects. The cap is also formed with a side tap to receive a set screw 49 which prevents accidental displacement of the cap with respect to the vave body. The adjustment of the cap lengthwise of the barrel 32 correspondingly alters the loading of the spring 46, and, therefore, the pressure at which the valve 35 will be lifted from its seat. The exterior surface of the cap 47 may be knurled to facilitate desired adjustments.

The tangential ducts 39 communicate with the cylindrical cage member 34 below the horizontal diametrical plane of the ball 35 as seated. The ball valve element 35 and the cage chamber 34 are precision made in order to provide close limits of tolerance with respect to the fit of the ball valve element within the cage chamber. The clearance between the ball valve element in its horizontal diametric plane and the annular wall of the cage chamber is such as to provide for an intervening film of oil (hydraulic fluid). For this purpose a clearance of the order of two one-thousandths of an inch (.002″) has been found satisfactory. The clearance is essentially a restricted annular channel between the ball 35 and the cylindrical wall of the chamber 34.

The clearance maintains a film of oil (hydraulic liquid) between the ball valve element and the surrounding cylindrical wall of the chamber 34 and provides for the restricted and retarded flow of the hydraulic liquid into and from the part of the chamber 33 between the ball 35 and the piston 41. The film of oil so maintained prevents undue lateral movement of the ball as it moves relatively to its seat in either axial direction of the chamber 34, permits some degree of rotative movement of the ball about a diametrical axis, and provides a seal against the free flow of the hydraulic fluid into and from the space between the ball and the piston. The film of oil thus, in practical effect, provides a slow releasing trap for the hydraulic liquid in such space, and, during the movement of the ball 35 toward its seat the hydraulic liquid so trapped seeps slowly past the ball to the outlet ducts 39 and thereby exerts a dash pot action of sufficient degree to contribute to the elimination of undue chattering of the ball.

In use, the cap 47 is adjusted to impose upon the ball 35 a load sufficient to counterbalance the desired limiting pressure for the press 21. Whenever the pressure upon the ram element exceeds the predetermined limit it acts on the ball through the inlet opening 37 and forces it upward from the seat 36, thereby establishing communication between the pump outlet line 15 and the return line 25. Inasmuch as the return line is subject to suction pressure, the ports 39 being of ample size, the operating liquid will quickly drain and will flow in an idle circuit from the line 15 to the return line 25 and thence to the pump. In this way the pump is relieved of destructive pressure effect. When the press and line pressure drops below the predetermined maximum, the ball 35 is again held seated by the spring 46, thereby closing communication between inlet and outlet ports 37 and 38.

The expanded cup washer 44 frictionally engages the bore of the chamber 33, and thus acts as a brake or drag on the movement of the piston 41 under the urge of the spring 46. Accordingly, as the ball 35 moves upon its seat in the chamber 34, it is free to turn to a limited extent and thereby to take its closing position without bouncing and chattering. At the same time, the spring 46 overcomes the frictional gripping of the cylinder bore by the washer 44, and moves the end of the stem 42 against the ball 35 to retain it in position until a high pressure condition again occurs.

The compounded action thus obtained not only eliminates harmful chattering and hydraulic hammering effects but also renders the valve applicable for adjustment over very wide ranges of pressures. Heretofore it has not been possible to use a single valve for work operations requiring such different ram pressures as, say, five hundred pounds at one time and ten times that value at another. With the valve of the present invention, it is not necessary to confine the press to a limited portion of its capacity, nor to insert a different valve in the lines 27 and 28 when changing from one working range to another. As long as the adjustment is within the range of the spring 46 the same valve may be employed.

When the hydraulic system includes a pulsating pump the line pressure varies or pulsates to a pronounced extent and the differential between the maximum and minimum pressures incident to the pulsations may exceed the relief valve opening and closing pressure differential, with the result that the relief valve chatters notwithstanding that the average line pressure may exceed the relief valve loading pressure. For such conditions (whether resultant from a pulsating pump or some other cause) the valve illustrated in Figures 5 to 8 is particularly suited.

This valve has the same relation in the hydraulic system as the valve first described and includes the same features of construction similarly operative, namely the seat section 31, the co-axial barrel 32 providing the cylindrical chamber 33, the cage chamber 34, the ball valve element 35, its seat 36, the inlet port 37, the outlet port 38, the ducts 39, the piston 41, its stem 42, the washer 44 secured by the nut 43, the helical spring 46, and the adjustable cap 47. The additional features of the valve shown in Figures 5 and 8 are set forth in the description which follows.

The piston stem 42 is formed as a tube having a lower axial passage 71 and a communicating upper axial passage 72 of somewhat greater diameter. At their junction an annular shoulder 73 is formed which provides a seat for a small ball check valve 74, the unseating movement of which is suitably limited by a transverse pin 75. The lower end of the stem 42 and the lower face of the nut 43 are formed with a continuous transverse groove 76 in order that the passage 71 and the cage chamber 34 may at all times be connected in a communicating path for the flow, in either direction, of the hydraulic fluid. The lower passage 71 of the stem 42 is in communication with the chamber 33 through a duct 77 of small diameter, preferably extending diagonally inward and downward from the chamber 33 and which provides a restricted orifice through which the hydraulic liquid may flow only at a retarded rate. The upper passage 72 of the stem 42 is in communication with the chamber 33 through an orifice 78 of comparatively large diameter. When the piston 41 moves upward hydraulic fluid flows from the chamber 33 to the cage chamber 34 through the duct 77, passage 71 and groove 76. When the piston 41 moves downward hydraulic fluid flows from the cage chamber 34 to the chamber 33 through the groove 76, passages 71 and 72 and orifice 78.

A second expansible friction washer 81, similar to the washer 44, is positioned in inverted relation upon the stem 42 above the piston 41, with its base bearing upon the piston. The washer 81 is firmly held in position by a collar 82 slidably mounted upon the stem 42 and which provides an abutment for the lower end of the spring 46 by which it is held in clamping engagement with the base of the washer 81. A third expansible sealing washer 84 of similar construction is provided at the upper end of the chamber 33 and is held in position by a collar 83 slidably mounted upon the stem 42 and providing an abutment for the upper end of the spring by which it is held in clamping engagement with the base of the washer 84. The outer portion of the stem 42 is slidably mounted in an axial recess in a follower block 85, which in turn is held in position by the cap 47, its outer flat face bearing against the inner flat face of the cap and its inner flat face providing an abutment for the base of the washer 84 and against which the washer base is clamped by the collar 83 as above described. The washer 84 prevents leakage of the hydraulic fluid from the outer end of the chamber 33. Leakage of the hydraulic fluid from the outer end of the upper passage 72 of the stem 42 is prevented by a sealing plug 86.

When the cap 47 is turned to effect an adjustment of the compression of the spring 46 the follower block 85 moves with it. If the cap be backed off to reduce the compression of the spring 46 the follower block is caused to move with the cap by the spring as it expands. If the cap be moved inward to increase the compression of the spring the follower block is directly moved inward by the cap, the force for the compression of the spring being transmitted through the washer 84 and collar 83 which are free to slide along the stem 42. The spring 46 in all cases exerts its force, by means of the collars 82 and 83, upon the sealing and friction washers 81 and 84 and thereby maintains them in their operative positions in which they provide efficient hydraulic fluid seals and bear with suitable frictional pressure against the cylindrical walls of the chamber 33.

Inasmuch as the portion of the chamber 33 above the piston 41 is in fluid communication with the cage chamber 34 in either direction of movement of the piston a hydraulic dash pot type of action is created as the valve operates, in addition to the action described in connection with the first embodiment. This additional action may be more readily understood by referring to Figure 9, in which the various conditions are illustrated graphically.

The horizontal axis of the diagram represents time, the full line sinusoidal curve 91, marked "pump pressure," represents the instantaneous effluent pressure in the line 15, and the horizontal shaded band 92, marked "valve setting," represents the average or mean of the effluent pressure depicted by the curve 91, such average or mean being the narrow range or zone in which the valve will in any event remain seated and will be free from chattering. The high and low pressure nodes of the curve 91 are substantially above and below the band 92. It is accordingly manifest that the ordinary poppet valve element in the ordinary relationship will tend to snap or flutter violently between the limits of its opening and closing movement in its responses to the pulsations represented by the curve 91 and that such fluttering creates chattering and hydraulic hammer conditions injurious to the equipment.

The force of the hydraulic liquid under high pressure upon the ball 35 is transmitted to the liquid in the chamber 33, by upward movement of the piston 41. The check valve 74 being closed on such upward movement the trapped liquid escapes through the restricted orifice provided by the duct 77, the cage chamber 34 the while being under very low, or even negative, pressure, since its outlet port 38 is connected to the pump suction inlet. The opening action of the valve is, therefore, slow as compared to the rate of pressure pulsation.

When the instantaneous effluent pressure drops below normal closing pressure, rapid downward movement is prevented by the large area of engagement between the washers 44 and 81 and the wall of the chamber 33. In addition such movement tends to place the chamber 33 under slight negative pressure, thereby causing liquid to flow from the cage chamber 34 through the passage 71, past the check valve 74 which opens automatically and through the passage 72 and orifice 73 into the chamber 33 in sufficient degree to replenish its contents and condition the valve for the next high pressure surge.

In Figure 9 the wavy line 93, marked "valve stem motion," represents the operating condition over high line pressures which leads to by-passing, as can be measured by displacement of the valve stem 42 under test conditions. The valve has a tendency to very slight movement in opening and closing directions, i. e., to "hunt" after the pressure curve, but due to the features just described it is maintained in open position, free from chattering, despite the wide instantaneous pressure variations. In order to show this effect the valve stem displacement curve 93 has been drawn on a disproportionately large scale. When the overload condition is eliminated, the pump pressure curve assumes a much lower position, as indicated by the dotted line 94. Even though the instantaneous peaks of this curve may generate pressures higher than the valve opening pressure, full valve opening will not occur, due to the slow opening action just explained. Such full opening takes place only at a time when the mean pressure has reached such a value as to correspond to the range 92.

In operation, it has been found that a valve so constructed will automatically compensate for very pronounced conditions of pulsation, and eliminate all of the difficulties which have heretofore been encountered from this cause. As with the valve of Figure 1, the operation is quiet, and free from chattering and hydraulic hammer effects, and the valve may be adjusted throughout the entire range of press capacity.

I claim:

1. A pressure relief valve comprising a body formed with communicating cylindrical piston and valve element chambers, an inlet port formed in the body in communication with the valve element chamber at one end thereof, an outlet port formed in the body in communication with the valve element chamber at one side thereof and below the opposite end of said valve element chamber, a ball valve in said valve element chamber adapted when seated to close the inlet port and cover the outlet port, the diameter of said valve element chamber being only slightly in excess of that of the ball whereby to provide a restricted passage which maintains a lubricating film of liquid between the ball and the wall of said valve element chamber and which retards liquid flow between the chambers in a degree which is a functional component of the prevention of chattering, a piston stem reciprocably movable in the piston chamber and in constant engagement with the ball valve, an outwardly flaring flexible cup washer on the stem frictionally engaging the wall of the piston chamber, a spring in the piston chamber acting upon the piston and urging the stem in a direction to effect the seating of the ball valve, and means for adjusting the force exerted by the spring.

2. A pressure relief valve comprising an elongated valve body formed with a cylindrical piston chamber axially thereof, a cylindrical valve element chamber adjoining one end of the piston chamber and communicating therewith, an inlet port extending axially of the body at one end of the valve element chamber, the junction between the port and chamber forming a valve seat, a ball valve on said seat and in said valve element chamber, said ball having a diameter slightly less than that of its chamber whereby lateral movement of the ball in its chamber is limited and the liquid under pressure may form a lubricating film between the ball and the cylindrical wall of its chamber, the ball and the cylindrical wall of the valve element chamber cooperating to provide a restricted passage which retards the flow of liquid between the chambers in a degree which is a functional component of the prevention of chattering, a laterally extending outlet port formed in the body and communicating with the valve element chamber below the transverse diameter of the ball as seated, a piston axially movable in the piston chamber, a stem upon which the piston is mounted, an outwardly flaring flexible cup washer mounted on the stem and against the piston and subject to the pressure of the fluid in the space between it and the ball valve, means for holding the washer on the stem, the washer having tight frictional engagement with the wall of the piston chamber, a spring in the piston chamber around the stem and urging said stem against the ball to move it toward and hold it upon its seat, and an adjustable cap on the end of the body applying compressive force to the spring.

3. A pressure relief valve comprising a body formed with communicating cylindrical piston and valve element chambers, an inlet port at one end of the valve element chamber, an outlet port communicating with the valve element chamber and spaced from the inlet port, a ball valve in the valve element chamber between said ports normally to occlude communication between them, a tubular piston stem in the piston chamber, a piston on the stem, a flexible cup washer on the stem adjacent the piston which frictionally engages the wall of the piston chamber and provides a fluid seal, a check valve on the piston stem, ports in the wall of the stem on opposite sides of the check valve, said ports being positioned above the piston and cup washer, one of said ports being restricted to retard the flow of liquid through it, and a spring in the piston chamber above the piston to urge the piston stem against the ball, thereby to move the valve toward, and hold it upon, its seat.

4. A pressure relief valve comprising a body having communicating cylindrical piston and valve element chambers, an inlet port communicating with one end of the valve element chamber, an outlet port also communicating with the valve element chamber, a ball valve positioned in the valve element chamber between said ports and, as seated, occluding communication between them, a piston assembly in the piston chamber above the ball valve, said assembly including a tubular stem and a piston mounted upon the stem, the inner end of the stem being in open communication with the valve element chamber, cup washers surrounding the stem at opposite sides of the piston and frictionally engaging the wall of the piston chamber, a spring in the piston chamber around the stem and urging said assembly toward the ball valve, thereby to cause the stem to hold the ball valve normally closed, a check valve within the stem which, when open, provides for the admission of liquid into the space in the piston chamber around the spring, and a restricted passage in the wall of the stem inward of the check valve which, in the closed position of the check valve, provides reverse retarded flow communication between the piston chamber and the interior of the stem.

5. A pressure relief valve comprising a body having communicating piston and valve element chambers, inlet and outlet ports formed in the valve element chamber, a normally seated ball valve interposed between the ports to control communication between them, a tubular piston stem positioned in the piston chamber above the ball valve, a piston on the stem adjacent the ball, flexible cup washers mounted on opposite sides of the piston and frictionally engaging the wall of the piston chamber, a spring around the stem and urging the piston against the ball valve in order to move the ball valve toward, and hold it upon, its seat, a sealing washer positioned in the piston chamber around the stem and urged away from the ball by said spring, a cap member on the end of the body to retain the spring and sealing washer in the chamber, a check valve in the stem which opens to admit liquid into the chamber between the piston and the sealing washer, and a restricted passage formed in the wall of the stem inward of the check valve and which, in the closed position of the check valve, provides reverse retarded flow communication between the piston chamber and the interior of the stem.

6. A pressure relief valve comprising a body having communicating cylindrical piston and valve element chambers, inlet and outlet ports formed in the valve element chamber, a ball valve positioned in the valve element chamber between the ports to control communication between them, said ball valve having a diameter slightly less than that of the valve element chamber to provide a restricted passage which maintains a lubricating film of liquid under pressure, said ball valve when seated closing the inlet port, a tubular piston stem in the piston chamber above the ball valve and ports, a piston mounted upon the stem, a pair of flexible cup washers mounted on the stem at opposite sides of the piston, said washers tightly and frictionally engaging the wall of the piston chamber, a spring positioned in the piston chamber around the stem and urging the stem toward the ball valve, thereby to effect the normal seating of the ball valve, a sealing washer positioned around the stem and engaging the wall of the piston chamber adjacent the opposite end of the body, said stem being slidable with respect to said sealing washer, a follower engaging the sealing washer and overlying said stem and spring, a cap covering the follower and retaining said spring in the piston chamber, said cap being adjustable to vary the force exerted by the spring, a check valve in the stem and adapted when seated, to prevent the flow of liquid through the stem, a port in the stem above the check valve to provide communication between the space in the piston chamber around the spring and the interior of said stem, and a second restricted passage formed in the stem below the check valve to provide reverse flow communication between the chambers through the stem.

7. A pressure relief valve comprising a body formed with communicating piston and valve element chambers, a movable stem within and coaxial with the piston chamber, angularly related inlet and outlet ports communicating with the valve element chamber, a valve seat between said ports, a ball valve cooperating with the seat, the diameter of said valve element chamber being only slightly in excess of that of the ball valve whereby to provide a restricted passage which maintains a lubricating film of liquid under pressure between the ball valve and the wall of said valve element chamber, such film retarding the flow of liquid between the chambers in a degree which is a functional component of the prevention of chattering, a piston mounted upon the stem within the piston chamber and subject to the dash pot effect, as controlled by said film, of the liquid confined in the space below it, means associated with the piston for sealing and frictional engagement with the wall of the piston chamber, and a spring in the piston chamber which urges the stem toward the ball valve to effect its normal seating.

8. A pressure relief valve as set forth in claim 7 wherein means is provided for adjusting the force exerted by the spring.

9. A pressure relief valve as set forth in claim 7 wherein the piston stem is tubular and is in open communication with the space between the piston and the ball, a check valve is mounted within the stem, and the stem is provided with passages adjacent opposite sides of said check valve and in communication with the piston chamber, the innermost of said passages providing a restricted orifice through which liquid can flow from the piston chamber only at a retarded rate.

10. A pressure relief valve as set forth in claim 7 wherein the piston stem is tubular and is in open communication with the space between the piston and the ball, a check valve is mounted within the stem, the stem is provided with passages adjacent opposite sides of said check valve and in communication with the piston chamber, the innermost of said passages providing a restricted orifice through which liquid can flow from the piston chamber only at a retarded rate, and means is provided for adjusting the force exerted by the spring.

11. A pressure relief valve as set forth in claim 7 wherein the piston stem is tubular and is in open communication with the space between the piston and the ball, a check valve is mounted within the stem, the stem is provided with passages adjacent opposite sides of said check valve and in communication with the piston chamber, the innermost of said passages providing a restricted orifice through which liquid can flow from the piston chamber only at a retarded rate, and the means associated with the piston for sealing and frictional engagement with the wall of the piston chamber is provided adjacent both sides of the piston.

12. A pressure relief valve as set forth in claim 7 wherein the piston stem is tubular and is in open communication with the space between the piston and the ball, a check valve is mounted within the stem, the stem is provided with passages adjacent opposite sides of the check valve and in communication with the piston chamber, the innermost of said passages providing a restricted orifice through which liquid can flow from the piston chamber only at a retarded rate, the means associated with the piston for sealing and frictional engagement with the wall of the piston chamber is provided adjacent both sides of the piston, and means is provided for adjusting the force exerted by the spring.

13. A pressure relief valve as set forth in claim 7 wherein the piston stem is tubular and is in open communication with the space between the piston and the ball, a check valve is mounted within the stem, the stem is provided with passages adjacent opposite sides of the check valve and in communication with the piston chamber, the innermost of said passages providing a restricted orifice through which liquid can flow from the piston chamber only at a retarded rate, the means associated with the piston for sealing and frictional engagement with the wall of the piston chamber is provided adjacent both sides of the piston, means is provided for adjusting the force exerted by the spring which consists of a cap connected to the piston chamber for positional adjustment in the direction of the axis of said chamber, and a follower block which adjoins the inner face of the cap and provides an abutment for the upper end of the spring, and means is associated with the follower block for sealing and frictional engagement with the wall of the piston chamber.

14. A pressure relief valve comprising a body formed with communicating cylindrical piston and valve element chambers, the valve element chamber having an inlet port at one end thereof, an outlet port at one side thereof, and a valve seat adjoining and alining the inlet port, a ball valve member cooperating with the seat, the diameter of said valve element chamber being only slightly in excess of that of the ball valve whereby to provide a restricted passage which maintains a lubricating film between the ball and the wall of said valve element chamber and which retards the flow of liquid between the chambers in a degree which is a functional component of the prevention of chattering, a piston slidably fitted in the piston chamber, a piston stem upon which the piston is mounted, an outwardly flaring flexible cup washer mounted on the piston stem and frictionally engaging and gripping the wall of the piston chamber, the piston chamber below the piston being in communication with the valve element chamber, a spring in the piston chamber above the piston and which urges the piston stem toward the valve element, causing the stem to move said valve element toward, and normally hold it upon, its seat, the space below the piston being filled with liquid flowing through said restricted passage and which exerts a dash pot action on the motion of the piston and a second restricted passage providing communication between the spacers of the piston chamber above and below the piston and which provides for a second dash pot action in connection with the motion of the piston.

15. A pressure relief valve comprising a body formed with communicating piston and valve element chambers, a movable stem within and coaxial with the piston chamber, angularly related inlet and outlet ports communicating with the valve element chamber, a valve seat between said ports, a ball valve cooperating with the seat, the diameter of said valve element chamber being only slightly in excess of that of the ball valve whereby to provide a restricted passage which maintains a lubricating film of liquid under pressure between the ball valve and the wall of said valve element chamber, such film retarding the flow of liquid between the chambers in a degree which is a functional component of the prevention of chattering, a piston mounted upon the stem within the piston chamber and subject to the dash pot effect, as controlled by said film, of the liquid confined in the space below it, means associated with the piston for sealing and frictional engagement with the wall of the piston chamber, a spring in the piston chamber which urges the stem toward the ball valve to effect its normal seating, a passage open to the space below the piston and between the piston and the ball valve and which establishes communication between such space and the space of the piston chamber above the piston, said passage communicating with the space above the piston by a port which permits the free flow of the liquid and by a restricted orifice below the port and which effects the retarded flow of the liquid, and a check valve arranged in the space between the port and the orifice and which opens when the piston moves downward whereby the liquid flows through the port into the space above the piston and closes when the piston moves upward whereby the liquid flows through the restricted orifice from the space above the piston.

FRANK C. WILSON.

REFERENCES CITED

The following references are of record in the file of this patent:

UNITED STATES PATENTS

| Number | Name | Date |
|---|---|---|
| 420,155 | Hageman | Jan. 28, 1890 |
| 480,528 | Thoms | Aug. 9, 1892 |
| 965,052 | Wainwright | July 19, 1910 |
| 1,735,490 | Barley | Nov. 12, 1929 |